April 2, 1968 J. A. FEHR, JR 3,376,377
ELECTRIC POWER BUSWAY WITH PHASE COLLECTION AND
BRANCH TAKE-OFF MEANS
Filed Aug. 5, 1966 3 Sheets-Sheet 1

INVENTOR.
JOSEPH A. FEHR, JR.
BY Robert A. Casey
ATTORNEY

April 2, 1968 J. A. FEHR, JR 3,376,377
ELECTRIC POWER BUSWAY WITH PHASE COLLECTION AND
BRANCH TAKE-OFF MEANS
Filed Aug. 5, 1966 3 Sheets-Sheet 2

INVENTOR
JOSEPH A. FEHR, JR.
BY Robert H. Casey
ATTORNEY

April 2, 1968          J. A. FEHR, JR          3,376,377
ELECTRIC POWER BUSWAY WITH PHASE COLLECTION AND
BRANCH TAKE-OFF MEANS Filed Aug. 5, 1966          3 Sheets-Sheet 3

INVENTOR
JOSEPH A. FEHR, JR.
BY Robert T. Casey
ATTORNEY

United States Patent Office 3,376,377
Patented Apr. 2, 1968

3,376,377
ELECTRIC POWER BUSWAY WITH PHASE COLLECTION AND BRANCH TAKE-OFF MEANS
Joseph A. Fehr, Jr., Simsbury, Conn., assignor to General Electric Company, a corporation of New York
Filed Aug. 5, 1966, Ser. No. 570,596
9 Claims. (Cl. 174—72)

ABSTRACT OF THE DISCLOSURE

An electric power busway including a plurality of generally rectangular rigid busbar conductors supported in an elongated sheet metallic enclosure; the busbars are "fanned out" at each end of the housing in configurations adapted to overlap with ends of corersponding busbars of another similar busway section placed in a juxtaposed lengthwise relation thereto; the offsetting or "fanning out" of the busbars is made greater than necessary for electrical clearance purposes, and conductive spacer members are included which are removably retained in place; the spacer members may be removed and branch power take-off busbar ends inserted in their place, the latter being clamped and connected by the same simple clamp bolt means that clamps the two original sections.

BACKGROUND OF THE INVENTION

(1) Field of the invention

My invention relates to electric power busways, and particularly to such busways of the multiphase type comprising a plurality of relatively wide thin flat busbars supported in an elongated sheet metallic enclosure or duct.

(2) Description of the prior art

Electric power busways of the type with which the present invention is concerned comprise prefabricated elongated sections, such as 10-foot sections which are connected together to provide an electric power distribution system for conducting power from a central location throughout a building such as a commercial building or factory, to the point of utilization or further subdivided distribution. An important advantage of such busways is their basic flexibility, that is, with prefabricated standard busway sections, elbows, joints, etc., the needs of virtually any application may be supplied. In addition, since the busway sections are joined by releasable means, such as by bolting, such systems may be disconnected and reconnected in different configurations to take care of changing needs within the same building. An important aspect of this flexibility is the capability of the basic system to be utilized to supply the needs of power distribution applications of greatly varying magnitude, that is, for example, such systems may be used to distribute three-phase power of 100 or 225 amperes and the same basic 10-foot section may also be used in parallel runs to supply the needs of applications up to 2000 or more amperes.

Such electric power busways are ordinarily constructed of one of two main types. The first type is known as the "feeder" type, which is used primarily to transport current from one location to another, without affording means for making branch power taps or take-offs at intermediate points along the length of the run. The second type is known as the "plus-in" type, which, as its name implies, includes facility for making power taps or take-offs at numerous spaced points along the length thereof, ordinarily by plug-in type power take-off means.

Occasionally it is desirable to make a power take-off at an intermediate point of a feeder power busway run. In such case, in accordance with prior art apparatus, it is necessary to utilize a special T type joint, which affords a branch take-off run at right-angles to the main run. Since the decision to make a power tap-off may be made following the initial installation of the main busway, it is often very inconvenient to introduce such a special joint means at such later time.

Also, when power busways are installed in parallel multiple run relation in order to conduct relatively high currents, it is desirable that the corresponding phase bars in each of the runs be interconnected at frequent points, in order to equally distribute the load of current drawn among all bars. In addition, such phase collection connections likewise distribute the excess current which may flow during a short-circuit condition, thereby greatly reducing the possible adverse effects. In accordance with prior art apparatus, the making of such phase collection interconnections has involved substantial difficulty or has resulted in a change in the over-all width of the busway connection at a particular point, or both.

Objects of the invention

It is an object of the present invention to provide an electric power busway of the "feeder" type including generally rectangular cross-section busbars supported in insulated relation in a sheet metal elongated housing or duct, and having end portions projecting therefrom for connection to other similar busway lengths, which although having the intermediate part of the busbars between joints completely insulated and closely spaced for low reactance, permits the taking off of power at intermediate points along a run of such busway.

It is another important object of the invention to provide an electric power busway of the type described which can be readily connected in multipole assemblies of such busway runs, with each of said busway runs permitting the ready interconnection of corresponding phase bars by "phase collection straps," without making the over-all width of the housing greater than in the single run version.

Another object of the invention is to provide a multipole parallel run busway having a housing of simplified construction and extremely high strength.

Another object of the invention is to provide an electric power busway of the type described which permits the taking off of power at intermediate points along a run by readily introducing power take-off straps at joints interconnecting successive longitudinal lengths of said power busway by a single bolt clamp-type joint.

Summary of the invention

In accordance with the invention in one form, an electric power busway is provided of the type including a plurality of generally rectangular rigid busbar conductors supported in an elongated sheet metallic enclosure. The busbars are "fanned out" at each end of the housing in configurations adapted to overlap with ends of corresponding busbars of another similar busway section placed in a juxtaposed lengthwise relation thereto. The offsetting or "fanning out" of the busbars is made greater than necessary for electrical clearance purposes, and conductive spacer members are included which are removably retained in place. Thus if and when desired, any such joint may be opened, the spacer members removed, and branch power take-off busbar ends inserted in their place, and clamped and connected by the same single clamp bolt means that clamps the two original sections. The spaced block member is made of highly conductive material, whereby the spacer block also acts as a "heat sink" and assists dissipation of heat generated in the joint.

In accordance with another aspect of the invention, a multiphase power busway is provided comprising a plurality of parallel interconnected busway runs. The busway runs are arranged in edge-to-edge relation with the housings thereof interconnected to form a single rigid, relatively wide, thin housing, having a plurality of ribs on either side thereof. The busbar ends of each busway section are offset as previously described, and the design of the housing is such that when a plurality of such runs are connected in aligned relation as previously described, the aforesaid spacer members may be omitted, and phase interconnection straps may be inserted in their place, extending transversely of said busway runs and interconnecting corresponding busbars of all of the sections. Such phase connection straps are, moreover, contained within the joint housing and protected thereby, and connected to the busbars of each run by the same single bolt clamping means utilized to interconnect the main busbar lengths of that run.

The invention will be more fully understood from the following detailed description and its scope will be pointed out in the appended claims.

In the drawings.

Description of a preferred embodiment

Figure 1:
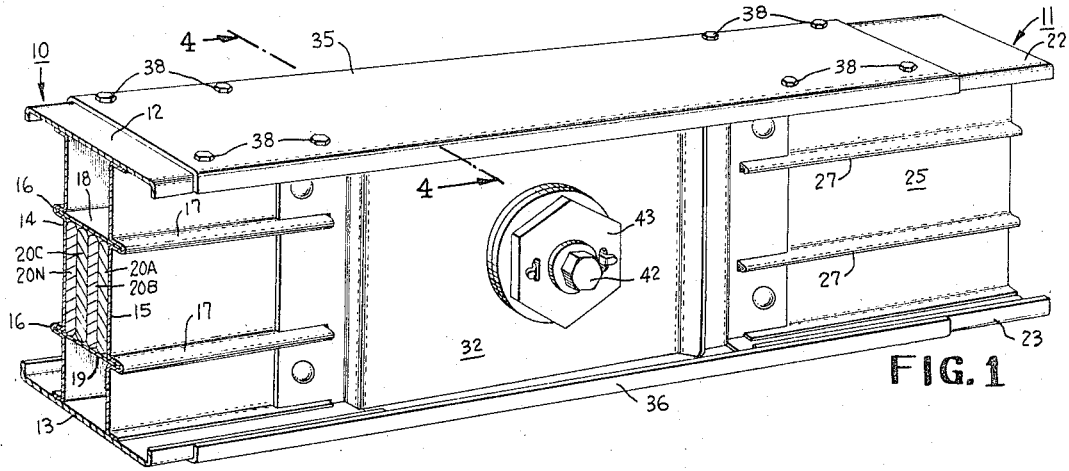
FIGURE 1 is a perspective view of a portion of a pair of interconnected busway sections.

In the drawings, the invention is shown as incorporated in an electric power busway system including a pair of interconnected elongated busway sections 10 and 11. The busway section 10 includes a generally channel-shaped top plate 12, a generally channel-shaped bottom plate 13, and a pair of side plates 14 and 15 interconnecting the top and bottom plates and attached thereto by suitable means, such as for example by welding. The side plates 14 and 15 have intermediate portions thereof bent outwardly in a U-shaped cross section configuration forming ribs 16 and 17. A pair of metallic "tie-plates" 18 and 19 extend between the side walls 14 and 15, and have edge portions received in and joined to the ribs 16 and 17 respectively. An assembly of relatively wide thin flat insulated busbar conductors 20A, 20B, 20C and 20N are contained within the rectangular space formed by the intermediate portions of the side plate 14, 15 and the spaced tie-plates 18 and 19. The busway section 11 is similarly made up of top and bottom plates 22 and 23 respectively, interconnected by side plates 24, 25, the side plate 24 has intermediate ribs 26 and the side plate 25 has intermediate ribs 27, similar to the ribs 16 and 17 of the sides 14 and 15 previously described. The section 11 also includes intermediate tie-plates, not shown and busbar conductors 30A, 30B, 30C and 30N respectively (see FIG. 2).

Figure 2:
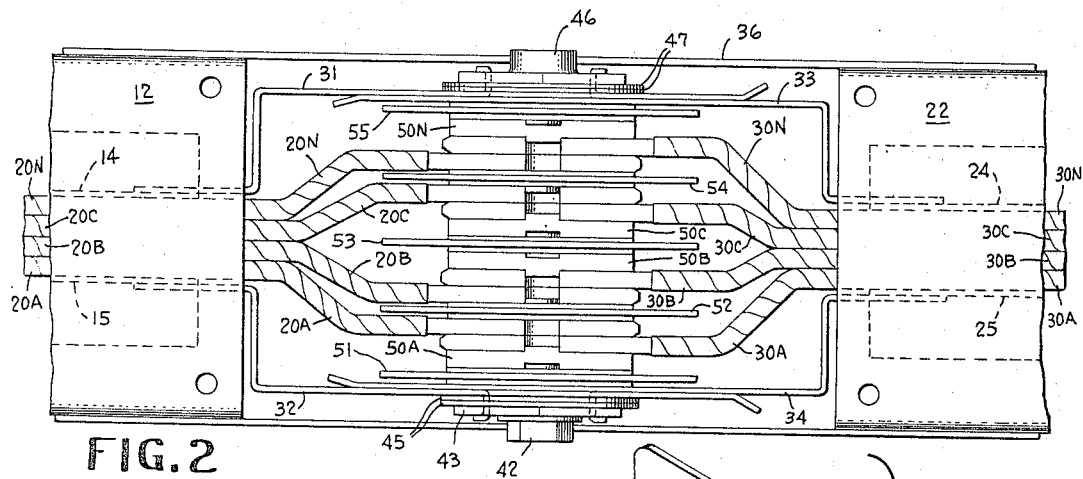
FIGURE 2 is a top plan view of the apparatus shown in FIGURE 1, the top joint cover plate being removed.

As best shown in FIGURES 1 and 2, the housing side wall members 14, 15 and 24, 25 are provided with offset extensions 31, 32 and 33, 34 which overlap as indicated in FIGURE 2 to form the side walls of the joint enclosure, to be described more in detail. Also, as shown particularly in FIGURE 1, the joint area enclosure is completed by top and bottom joint cover plates 35, 36 respectively, which are attached to the adjoining cover plates of the sections 10 and 11 by suitable means such as by bolts 38.

As shown in FIGURE 2, when the busway sections 10 and 11 are in their connected condition, the exposed ends of the busbars 20A, 20B, 20C, 20N overlap the corresponding exposed ends of the busbars 30A, 30B, 30C, 30N respectively. The ends of the busbars 20A, 20B, 20C, 20N are provided with bolt holes 40, and the exposed ends of the busbars 30A, 30B, 30C, 30N, are provided with endwise longitudinal extending open slots 41.

A clamping bolt 42 extends through the overlapped busbar assembly, and has its head overlying a pressure plate 43, which in turn presses against a pair of spring type or "Belleville" washers 45 against the joint side wall 32. The opposite end of the clamping bolt 42 threads into a flanged nut member 46 which in turn presses against a pair of spring type washers 47 against the side wall 31.

For a purpose to be described, a plurality of spacer members or blocks 50A, 50B, 50C and 50N are provided adjacent the overlapped busbars 20A–30A, 20B–30B, 20C–30C, 20N–30N, respectively. The adjacent overlapped busbar ends are insulated from each other by a plurality of generally rectangular rigid insulating plates 51, 52, 53, 54, and 55.

Figure 3:
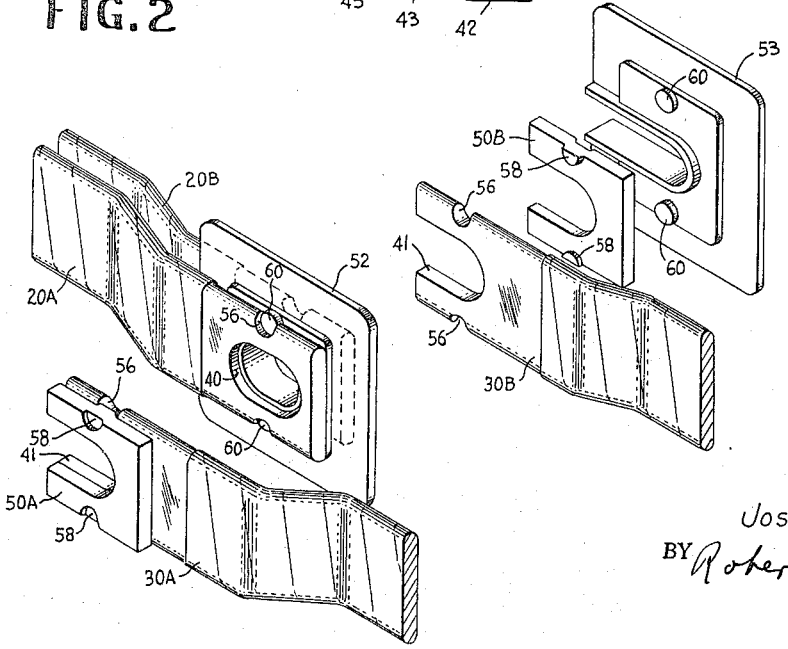
FIGURE 3 is an exploded perspective view of some of the busbar ends of the joint construction of FIGURES 1 and 2 with associated parts.
Figure 4:
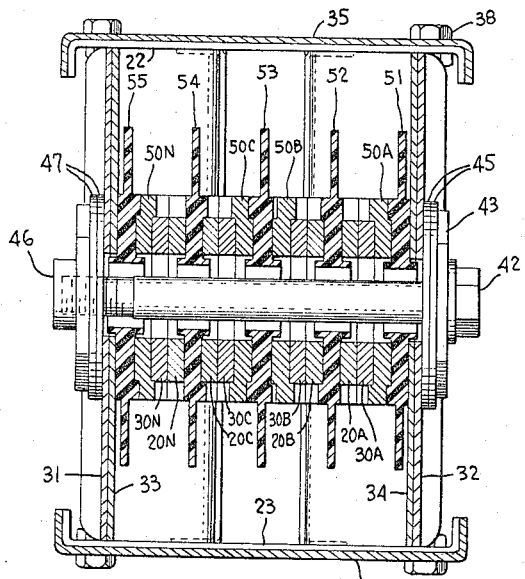
FIGURE 4 is a sectional view of the busways assembly of FIGURE 1, taken substantially on the line 4—4 of FIGURE 1.
Figure 5A:
FIGURE 5A is a fragmentary sectional view of the joining means of the multi-run busway of FIGURE 5.

Each of the busbars has a pair of semicircular notches 56 cut into opposite edge portions thereof as shown particularly in FIGURE 3. Each of the spacer blocks 50A, 50B, 50C, 50N, has a pair of corresponding semicircular bosses 58 formed thereon arranged and dimensioned to be received in corresponding pairs of notches 56 of adjacent busbars as shown in FIGURE 3.

Figure 7:
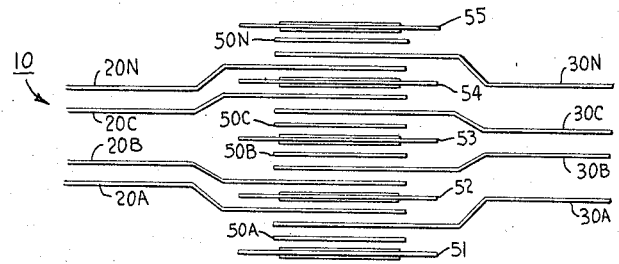
FIGURE 7 is a schematic drawing indicating the spacing and overlapping relationships of the busbars, insulators, and conductive spacer members of the apparatus of FIGURE 1.
Figure 8:
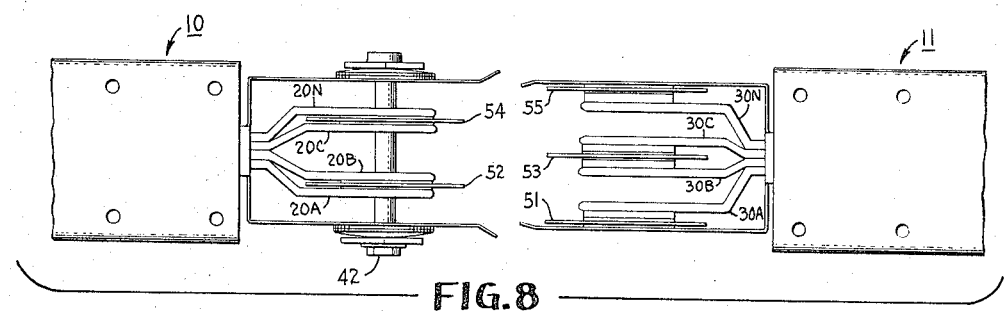
FIGURE 8 is a plan view of two busway section end portions constructed in accordance with the invention and shown in the position which they occupy just prior to assembly in interconnected relation.

As shown particularly in FIGURES 2 and 3, the boss portions 58 of the spacer members 50A–50N enter into the semicircular notches 56 of the busbar to which that particular spacer is adjacent. Likewise, the circular bosses 60 on the insulating plates 51–55, enter into the semicircular notches 56 of one only of the busbars to which it is adjacent. In accordance with this arrangement, combined with the particular offset pattern of the busbar ends, as shown particularly in FIGURES 7 and 8, it will be seen that the insulators 51–56 and the spacers 50A–50N are all trapped in place by this arrangement without the necessity for separate fastenings. Thus, all of the spacers 50A–50N, as well as the three insulators 51, 53 and 55, are permanently trapped by the end of the busway section 11, while the two insulator plates 52 and 54 are trapped by the busbar ends in the busway section 10. In this connection, it is pointed out that the busbar conductors 20A–20N and 30A–30N are relatively heavy and rigid and yet have a significant amount of resilience at the end portions so that both the insulating members and the spacers may be snapped in and out of position, although once in position they stay even during handling, shipping and installation.

Figure 5:
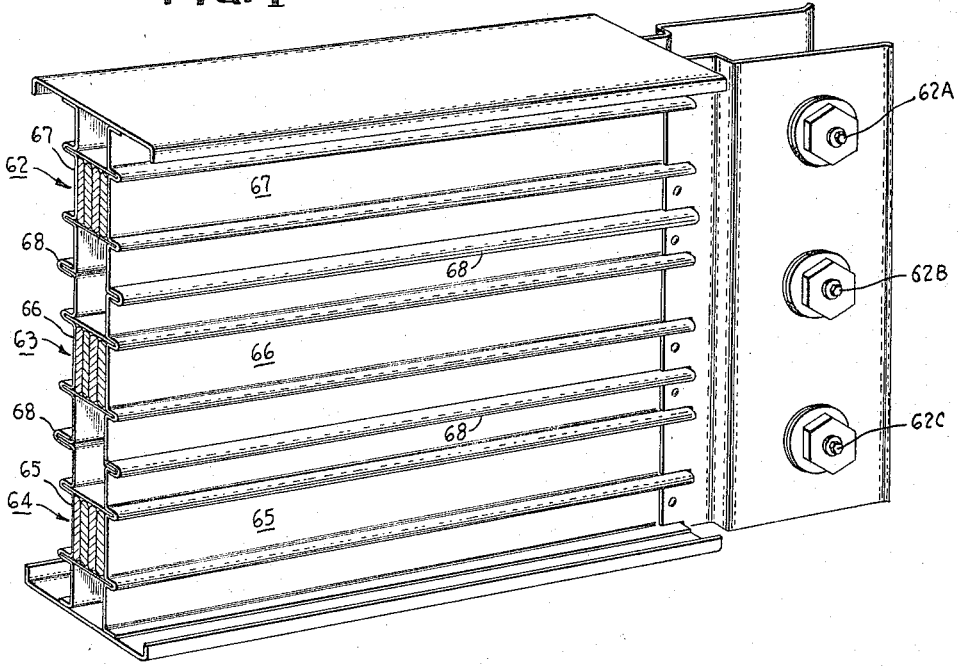
FIGURE 5 is a perspective view of a portion of a multi-phase, multi-run busway assembly.

In accordance with the invention, when desired, a plurality of runs of busway, such as sections 10 and 11 may be connected in parallel relation in the manner indicated in FIGURE 5, to provide in effect, a single high capacity busway.

Figure 6A:
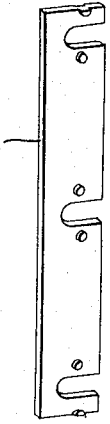
FIGURE 6A is a perspective view of a phase-collecting bar of FIGURE 6.
Figure 6:
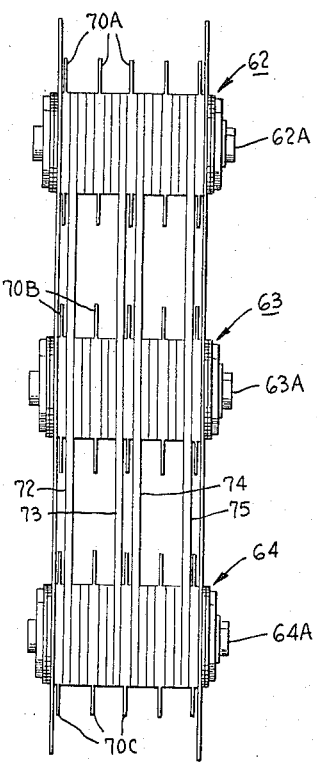
FIGURE 6 is a sectional view of a pair of inter-connected multi-phase, multi-run busway assemblies of the type shown in FIGURE 5, the view being taken transversely through the joint immediately to one side of the clamping bolts thereof.

In the construction illustrated in FIGURE 5, three busway runs 62, 63, and 64 are interconnected by having the adjacent ends of their side wall portions 65, 66, 67 joined together by wrapping a generally U-shaped joining strip 68 around the adjacent outwardly directed flanges of these side portions and welding it thereto. The construction and arrangement of the joint for the multiple busway run illustrated in FIGURE 5 in accordance with the invention, is shown in the sectional view of such a joint of FIGURE 6.

Each of the busway runs 62, 63, 64, has its own joint clamping bolt 62A, 62B, and 62C. Each of the busway runs 62, 63, 64 also includes insulator spacer plates 70A, 70B, and 70C, similar to the insulator plates 51–55 previously described. In accordance with the invention, however, for the purpose of accomplishing the function of phase-collection, the spacer members 50A, 50B, 50C, 50N are omitted from each of the joint assemblies of the busway lines 62A, 62B, 62C, and transversely interconnecting phase connection straps 72, 73, 74, 75 inserted, portions of these phase-collection straps taking the place of corresponding ones of the aforesaid spacer members, see FIGURES 6 and 6A.

It will be observed that the transverse dimension of the joints of the busway runs are maintained even with such phase-collection straps in place. It will also be observed that the construction of each of the busway runs 62, 63, 64 remains substantially identical with that described in connection with FIGURES 1–8 except for the interconnecting of the housings. Thus, phase-collection or phase connection is readily achieved without complicating the structure and without increasing the lateral or vertical dimension of the joint assembly.

Figure 9:
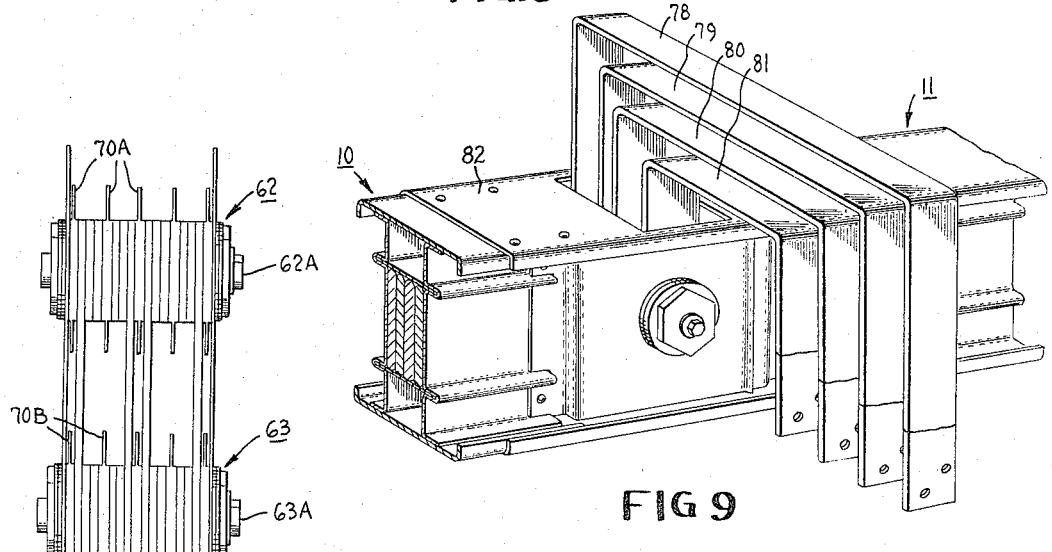
FIGURE 9 is a perspective view of a current tap-off connection made at a joint constructed in accordance with FIGURE 1.

Also, in accordance with the invention, a power tap or power take-off may be made at any joint in a run of busway constructed in accordance with the invention, as shown in FIGURES 1–8. As shown in FIGURE 9, such a current take-off may be made by inserting the ends of insulated power take-off busbar conductors 78, 79, 80, 81 in place of the corresponding spacer blocks 50A–50N, the joint housing cover 82 being suitably modified to permit the entrance of such power take-off devices.

While the invention has been illustrated and described in only specific embodiments, it will be readily apparent that many modifications thereof may be made. Thus, for example, the multiple run assembly of FIGURE 5 may comprise three busway runs having housings identical to that of the busway runs 10 and 11 of FIGURES 1–8, such housings being held in edgewise aligned relation in a suitable clamping means. It is, therefore, intended by the appended claims, to cover all such modifications as fall within the true spirit and scope of the invention.

What I claim as new and desire to secure by Letters Patent of the United States is:

1. Electric power busway apparatus comprising:
    (a) a first set of relatively wide, thins, flat electric busbar conductors of predetermined thickness disposed in a row with said wide surfaces parallel to each other;
    (b) a second set of relatively wide, thin, flat electrical busbar conductors disposed in a row with said wide surfaces parallel to each other;
    (c) said first set of busbar conductors having uninsulated end portions extending into interleaved overlapping arrangement with corresponding uninsulated end portions of said second set of busbar conductors to form a joint assembly;
    (d) housing means including a pair of opposed side wall members extending at opposite sides of said joint assembly;
    (e) clamping means comprising at least one clamping bolt acting on said opposed side wall members and urging said side wall members toward each other and against said assembly of overlapped busbar conductor end portions, thereby clamping all of said overlapped busbar conductor end portions into electrically contacting engagement;
    (f) insulating barrier means between each adjacent pair of said overlapped busbar conductor end portions;
    (g) and an electrically conductive spacer member between each overlapped pair of busbar conductor end portions and the corresponding adjacent one of said insulating barrier means;
    (h) said spacer members each having a thickness equal to said predetermined thickness of said busbar conductors; and
    (i) means removably mounting said spacer members in said assembly whereby said spacer members may be removed and end portions of a third set of busbar conductors inserted in the spaces occupied by said spacer members to provide a branch power take-off at right angles to said first and second busbar conductors.

2. Electric power busway apparatus as set forth in claim 1 wherein said spacer members are constructed of high thermal conductivity material, whereby each of said spacer members serves as a heat-sink for each of said corresponding overlapped pairs of busbar conductor end portions.

3. Electric power busway apparatus as set forth in claim 1 wherein said insulating barrier means and said spacer members are all trapped in place between said busbar conductor end portions and between said busbar conductor end portions and said side wall members of said joint housing by interfitting portions thereof without being positively fastened thereto.

4. An electric power busway section comprising:
    (a) an elongated housing of sheet metallic material;
    (b) at least four relatively wide, thin, flat busbar conductors of predetermined thickness supported in side-by-side relation in said housing, said busbar conductors having a relatively thin coating of insulating material thereon extending substantially from end-to-end thereof;
    (c) said four busbar conductors comprising an outer pair of busbar conductors and an inner pair of busbar conductors;
    (d) a first generally rectangular plate-like insulating barrier member supported in substantial alignment with the longitudinal center line of said elongated housing at a first end thereof;
    (e) a first pair of generally rectangular conductive spacer members having a thickness substantially equal to said thickness of said busbar conductors, said spacer members being disposed adjacent opposite sides of said first insulating barrier member;
    (f) said inner pair of busbar conductors having first exposed end portions thereof offset outwardly equally an amount substantially equal to the total thickness of said first insulating barrier member and said first pair of conductive spacer members;
    (g) said inner pair of busbar conductors having the opposite ends thereof offset outwardly equally an amount substantially equal to the total thickness of said central insulating barrier member plus said pair of spacer members plus two times the thickness of said busbar conductors, whereby said outwardly offset end portions of said inner pair of busbar conductors of said section are receivable between outwardly offset opposite end portions of a corresponding inner pair of busbar conductors of an adjacent busway section identical to said busway section;
    (h) said first insulating barrier member and said first pair of spacer members being trapped between said outwardly offset first end portions of said inner pair of busbar conductors without being positively fastened thereto;
    (i) said outer pair of said busbar conductors having uninsulated end portions thereof outwardly equally offset at the second end of said busway housing and spaced outwardly from each of said corresponding end portions of said inner pair of busbar conductors;

(j) a first pair of generally rectangular insulating barrier members each disposed between said corresponding end portions of said inner and outer pairs of busbar conductors at said second end of said housing;

(k) said outer pair of busbar conductors having uninsulated end portions thereof outwardly equally offset adjacent said first end of said busway housing, said end portions being spaced from corresponding ones of said first end portions of said inner pair of busbar conductors an amount equal to two times said predetermined thickness of said busbar conductors plus said predetermined thickness of one of said first pair of said insulating spacer members whereby said second end portions of said inner and outer pairs of busbar conductors and said first pair of said insulating spacer members are receivable in interleaved overlapping relation between outwardly offset first end portions of corresponding inner and outer pairs of busbar conductors of an adjacent busway section identical to said busway section;

(l) a pair of generally planar joint side wall members carried by said housing and extending lengthwise beyond said housing at said first end thereof, said side wall members extending at opposite sides of said busbar conductor end portions at said first end thereof;

(m) a second pair of generally rectangular spacer members of predetermined thickness;

(n) a second pair of generally rectangular plate-like insulating barrier members of predetermined thickness;

(o) said side wall members each being spaced from said first end portions of said outer pair of busbar conductors a distance substantially equal to said predetermined thickness of one of said second pair of spacer members plus said predetermined thickness of one of said second pair of insulating barrier members;

(p) one of said second pair of spacer members and one of said second pair of insulating barrier members being positioned between one of said outwardly offset first end portions of said outer pair of busbar conductors and one of said side wall members, the other of said second pair of spacer members and the other of said second pair of insulating barrier members being positioned between the other of said outwardly offset first end portions of said outer pair of busbar conductors and the other of said housing side wall members.

5. An electric power busway section as set forth in claim 4 said busway section also comprising means removably retaining said spacer members in position.

6. An electric power busway section as set forth in claim 4 wherein said insulating barrier members, said spacer members, and said end portions of said busbar conductors all have cooperating nesting formations permitting close side-by-side assembly but preventing relative sliding movement therebetween, said insulating barrier members and said spacer members all being removably trapped by said outwardlly offset end portions of said busbar conductors and by said side wall members.

7. A multiple run busway assembly comprising:
(a) a plurality of first busway sections including an elongated housing of sheet metallic material including a pair of opposed generally planar side wall members;
(b) a plurality of first electric power busbars supported in insulated relation in each of said housings of said first busway sections between said opposed side wall members and with a plurality of spacer members normally interspaced between the end portions of said busbars;
(c) means supporting said first busway section in parallel relation with corresponding end portions thereof in alignment in a plane extending parallel to said side wall members of said housings;
(d) a plurality of second busway sections including an elongated housing of sheet metallic material including a pair of opposed generally planar side wall members;
(e) a plurality of second electric power busbars supported in isulated relation in each of said housings of said second busway sections between said opposed side wall members and with a plurality of spacer members normally interspaced between the end portions of said busbars;
(f) means supporting said second busway sections in parallel relation with corresponding end portions thereof in alignment in a plane extending parallel to said side wall members of said housings;
(g) said end portion of each of said second busway sections being in connected engagement with a corresponding end portion of one of said first busway sections to form a busway joint;
(h) said spacer members of all of said first and second busway sections being omitted at said busway joint;
(i) a plurality of interconnecting busbar conductors extending at right angles to said busway sections and each interconnecting corresponding end portions of said busbars of said first and second busway sections;
(j) said interconecting busbar conductor having portions thereof occupying positions vacated by said omitted spacer members.

8. A multiple run busway assembly comprising:
(a) a plurality of busway sections, each of said busway sections including an elongated housing of sheet metallic material including a pair of opposed generally planar side wall members, said side wall members each comprising an intermediate major planar portion terminating in upper and lower flange portions;
(b) a plurality of electric power busbars supported in insulated relation in each of said housings between said opposed side wall members;
(c) means supporting said busway sections in parallel relation with correponding end portions thereof in alignment in a plane extending substantially parallel to said major portions of said side wall members, and with a pair of said flange portions of said side wall members of each of said busway sections in abutting relation with a corresponding pair of said flange portions of said side wall members of an adjacent busway section;
(d) means rigidly interconnecting said abutting flange portions all along the length thereof; and
(e) a generally planar sheet metal top wall interconnecting said upper flange portions of said uppermost busway section and a generally planar bottom wall interconnecting said bottom flange portions of said lowermost busway section to provide an enclosed multiple busway section housing.

9. A multiple run busway assembly as set forth in claim 8 wherein said means interconnecting said abutting flange portions comprises a generally C-shaped cross-section strip of metallic material having portions overlying each flange portion of each pair of said flange portions and means rigidly joining said strip to said flange portions.

References Cited
UNITED STATES PATENTS

| | | | |
|---|---|---|---|
| 3,004,097 | 10/1961 | Johnston et al. | 174—88 |
| 3,031,521 | 4/1962 | Krauss et al. | 174—88 |
| 3,170,747 | 2/1965 | Herrmann et al. | 174—72 |
| 3,183,298 | 5/1965 | Weimer et al. | 174—88 |
| 3,189,680 | 6/1965 | Stanback | 174—68 |

LARAMIE E. ASKIN, *Primary Examiner.*